(12) United States Patent
Kohlen et al.

(10) Patent No.: US 10,215,104 B2
(45) Date of Patent: Feb. 26, 2019

(54) VALVE DEVICE IN A MOTOR VEHICLE

(71) Applicant: Continental Automotive GmbH, Hannover (DE)

(72) Inventors: Peter Kohlen, Neu Anspach (DE); Rainer Johannes Montigny, Bad Soden (DE); Stefan Kopp, Bruchkoebel (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/536,784

(22) PCT Filed: Dec. 15, 2015

(86) PCT No.: PCT/EP2015/079820
§ 371 (c)(1),
(2) Date: Jun. 16, 2017

(87) PCT Pub. No.: WO2016/096874
PCT Pub. Date: Jun. 23, 2016

(65) Prior Publication Data
US 2017/0370298 A1     Dec. 28, 2017

(30) Foreign Application Priority Data

Dec. 19, 2014 (DE) .................. 10 2014 226 733

(51) Int. Cl.
*F02D 9/10*      (2006.01)
*F16K 1/226*     (2006.01)
(Continued)

(52) U.S. Cl.
CPC ......... *F02D 9/1015* (2013.01); *F02D 9/1025* (2013.01); *F16K 1/2261* (2013.01);
(Continued)

(58) Field of Classification Search
CPC ........ F02D 9/10; F02D 9/1015; F02D 9/1025; F02D 9/107; F16K 1/2261; F16K 1/226;
(Continued)

(56) References Cited

U.S. PATENT DOCUMENTS 5,081,972 A * 1/1992 Daly ............... F02D 9/1015
                                              123/337
5,749,335 A * 5/1998 Flanery, Jr. ........... F02D 9/16
                                              123/337
(Continued)

FOREIGN PATENT DOCUMENTS

CN      101523032       9/2009
CN      103261633       8/2013
(Continued)

OTHER PUBLICATIONS

Office Action dated May 14, 2018 which issued in the corresponding Korean Patent Application No. 10-2017-7016396.

*Primary Examiner* — John Kwon
*Assistant Examiner* — Johnny H Hoang
(74) *Attorney, Agent, or Firm* — Cozen O'Connor

(57) ABSTRACT

A valve device for a fuel cell arrangement in a motor vehicle includes: a housing; a flow channel extending in the housing; a flap configured to influence a flow cross-section in the flow channel; a shaft to which the flap is attached, the shaft being rotatably supported in the housing; a drive configured to drive the flap via the shaft; a valve seat arranged in the flow channel; and a seal including polytetrafluoroethylene (PTFE) arranged on a radially peripheral edge of the flap, the seal being configured to contact the valve seat with the flap in a closed position of the flap, so that the shaft passes through the flap at an angle. The seal includes a spring.

4 Claims, 3 Drawing Sheets

(51) Int. Cl.
  *H01M 8/04089* (2016.01)
  *H01M 8/04082* (2016.01)
  *F16J 15/3212* (2016.01)
  *F16K 17/10* (2006.01)
  *F16K 25/00* (2006.01)

(52) U.S. Cl.
  CPC ... *H01M 8/04089* (2013.01); *H01M 8/04201* (2013.01); *H01M 8/04216* (2013.01); *F02D 9/107* (2013.01); *F16J 15/3212* (2013.01); *F16K 17/105* (2013.01); *F16K 25/005* (2013.01)

(58) Field of Classification Search
  CPC .... F16K 1/2268; F16K 27/0218; F16K 35/04; F16K 17/105; F16K 25/005; H01M 8/04; H01M 8/04089; H01M 8/04216; H01M 8/04201
  USPC .................................................. 123/336, 337
  See application file for complete search history.

(56) References Cited

U.S. PATENT DOCUMENTS

| | | | | |
|---|---|---|---|---|
| 7,114,486 | B2* | 10/2006 | Hannewald | F02D 9/1025 |
| | | | | 123/337 |
| 8,386,149 | B2* | 2/2013 | Bellistri | F02D 31/007 |
| | | | | 123/470 |
| 2003/0164464 | A1 | 9/2003 | Haushaelter et al. | |
| 2006/0048747 | A1* | 3/2006 | Hannewald | F02D 9/1065 |
| | | | | 123/337 |
| 2008/0272324 | A1 | 11/2008 | Eggleston et al. | |

FOREIGN PATENT DOCUMENTS

| | | |
|---|---|---|
| DE | 29521334 | 3/1997 |
| DE | 10204787 | 8/2003 |
| DE | 10 2005 027 684 A1 | 12/2006 |
| DE | 10 2008 018494 A1 | 10/2009 |
| EP | 0 223 046 A2 | 5/1987 |
| JP | S 62-13550 | 3/1987 |
| JP | 2009-228740 | 10/2009 |

\* cited by examiner

VALVE DEVICE IN A MOTOR VEHICLE

CROSS-REFERENCE TO RELATED APPLICATIONS

This is a U.S. national stage of application No. PCT/EP2015/079820, filed on 15 Dec. 2015, which claims priority to the German Application No. 10 2014 226 733.1 filed 19 Dec. 2014, the content of both incorporated herein by reference.

BACKGROUND OF THE INVENTION

1. Field of the Invention

The invention relates to a valve device for a fuel cell arrangement in a motor vehicle with a flow channel extending in a housing, a flap that influences the flow cross-section and a drive that drives the flap. The flap is attached to a shaft and the shaft is rotatably supported in the housing. A valve seat is disposed in the flow channel and a seal disposed on a radially peripheral edge of the flap that is in contact with the valve seat with the flap in the closed position, so the shaft passes through the flap at an angle.

2. Related Art

Valve devices are used, for example, as throttle valve assemblies. Owing to the rotatably supported flap, it is possible to completely close the flow channel or to open the flow channel so as to regulate the mass throughput. In this case, in the event of adverse ambient influences ice can form in the flow channel and on the flap. Especially in the case of a parked vehicle, if the flap is in the emergency position, in which it only leaves a small gap in the flow channel free, such position of the flap promotes ice formation. As a result of the ice formation, uniform movement of the flap is disrupted. In the worst case, the ice formation prevents a sealed closure of the flow channel by the flap. Especially in the case of valve devices for fuel cell applications, in which likewise air flow has to be regulated, this situation has a particularly adverse effect, because the requirements relating to the sealing are 10 to 20 times greater than with conventional throttle valve assemblies. As a result, such valve devices are of complex design and thereby relatively cost intensive. In order to prevent ice formation, it is known to make the seal out of PTFE (polytetrafluorethylene). This should prevent ice formation in the region of the seal. Owing to the water-repellant action of such a seal, sealing problems caused by ice formation can be avoided. However, PTFE is not an elastic material, so the sealing effect thereof is poorer than it would be using a similarly designed elastomer. In particular, with such seals the relaxation rate needs improvement and the control quality of the mass throughput is not optimal owing to the creep behavior of a PTFE material.

SUMMARY OF THE INVENTION

It is therefore an object of the invention to provide a valve device that enables reliable sealing of the flow channel with only slight leakage and at the same time prevents ice formation in adverse weather conditions. The seal necessary for this should, moreover, be simple and inexpensive.

The object may be achieved by the seal containing a spring.

With the arrangement of a spring, the sealing function of the seal and the control quality of the mass throughput are supported and improved by increasing the elasticity and relaxation rate of the seal.

Because the seal is affected differently over the periphery, it is sufficient to dispose the spring only at the points necessary for this. However, the resulting positionally accurate arrangement of the spring to the flap requires increased complexity during assembly and represents a source of error. This can be avoided according to one advantageous embodiment by making the spring radially peripheral, so that the positionally accurate orientation relative to the flap is dispensed with.

The assembly can be further simplified if the spring is attached to the seal. The spring and seal can thereby be pre-mounted and disposed on the flap as one component.

In another embodiment, the spring is shielded from ambient influences if it is integrated within the seal. Such integration can for example involve molding the sealing material over the spring.

The spring can be particularly simply manufactured if it comprises an annular base body, from which at least one spring tongue protrudes radially outwards.

The spring is of a particularly simple structural design if it comprises a radially peripheral spring tongue.

Because of the arrangement of the flap in the flow channel, the seal must operate differently in terms of the distribution over the periphery, so that in the event of only one spring tongue the tongue will be loaded differently. This is avoided according to another advantageous embodiment by providing a plurality of spring tongues on the spring. Depending on the size of the flap and hence the seal and the application, the spring action is better utilized if the spring comprises between 10 and 30 spring tongues.

In the simplest case, all the spring tongues are implemented the same, so that every spring tongue has the same spring constant.

For special requirements, it can be necessary to adapt the spring action of the seal specifically to the positional alignment. For this case, it is advantageous to implement the spring tongues with different spring constants. Different spring constants can be produced by different lengths, widths and/or spacings.

A robust spring is advantageously achieved with a metal embodiment.

According to one advantageous embodiment, the attachment of the seal and the spring can be achieved simply by partly enveloping the seal and the spring with the flap material, preferably by molding over.

The regions to be injection molded can be reduced if the spring comprises at least one section that forms an undercut and that is filled with the flap material. This enables flap material to be saved without affecting the retention of the spring, because secure retention is guaranteed by the at least one undercut.

BRIEF DESCRIPTION OF THE DRAWINGS

The invention is described in detail using an exemplary embodiment. In the figures.

DETAILED DESCRIPTION OF THE PRESENTLY PREFERRED EMBODIMENTS

Figure 1:
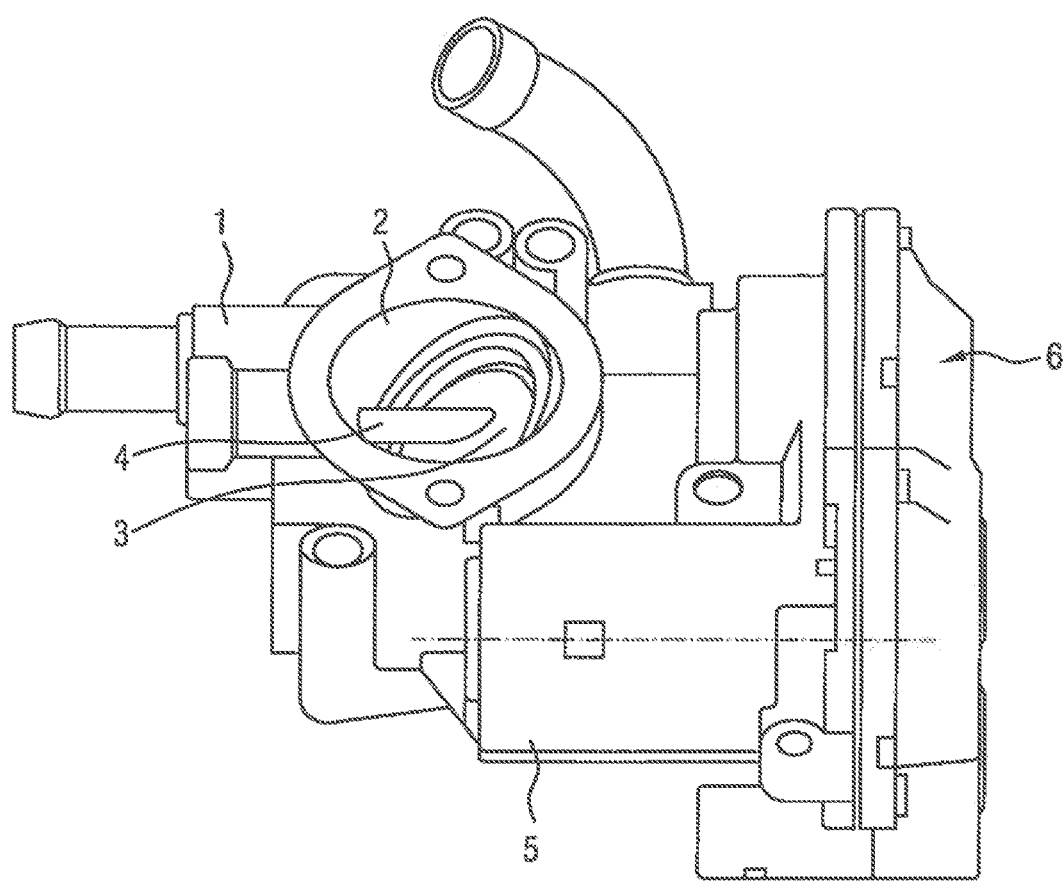
FIG. 1 shows a valve device according to an embodiment of the invention.

FIG. 1 shows a throttle valve assembly with a housing 1 and a flow channel 2 disposed in the housing 1, in which a disk-shaped flap 3 is disposed. The flap 3 is fixedly joined to a shaft 4 and the shaft 4 is rotatably supported in the housing 1. The shaft 4 is driven by an electric motor 5 that is disposed in the housing 1, wherein a gearbox 6 is interposed between the shaft 4 and the electric motor 5.

Figure 2:
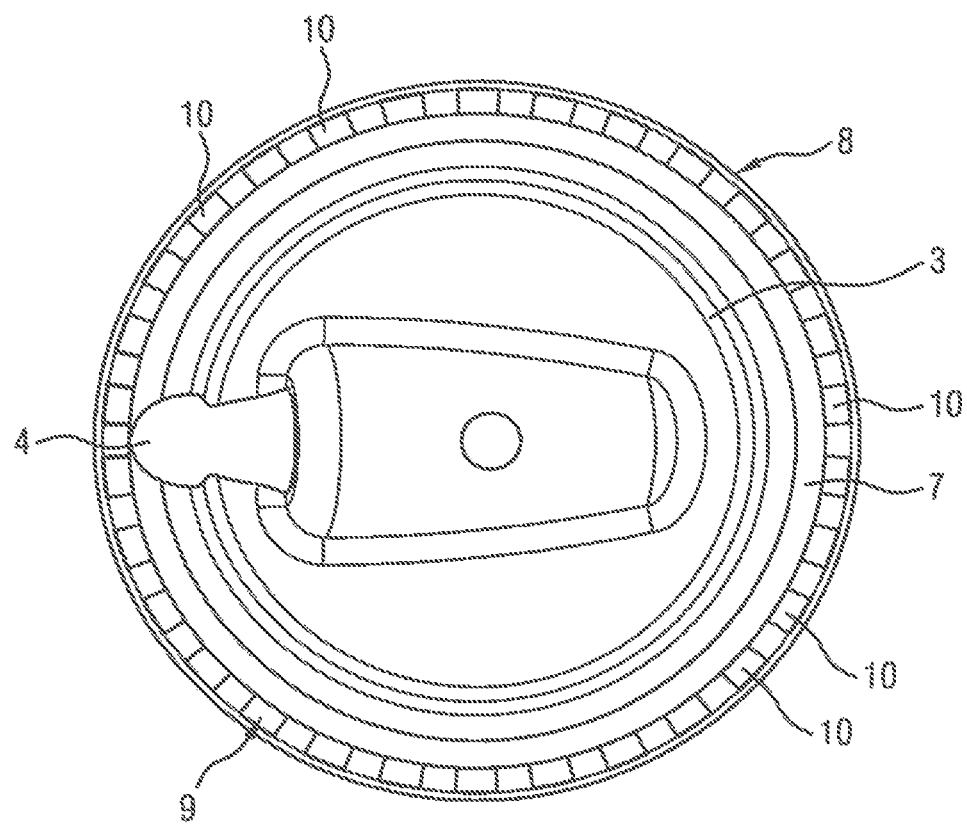
FIG. 2 shows the flap of FIG. 1.

FIG. 2 shows the flap 3 with a part of the shaft 4. A seal 8 is disposed on the radially outer edge 7 of the flap 3. The seal 8 extends on the periphery of the edge 7 and thus ensures the sealing of the flow channel 2 if the flap 3 is in the closed position. In the representation shown, a spring 9 is disposed on the seal 8 that comprises a plurality of identically implemented spring tongues 10 that rest on the seal 8, being directed radially outwards, and thus support the spring action of the seal. The spring tongues 10 are uniformly disposed on the periphery.

Figure 3:
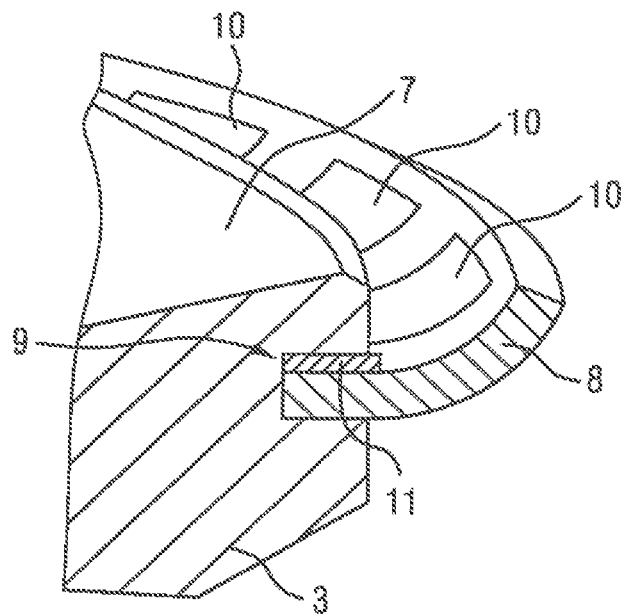
FIGS. 3 and 4 show magnified representations of the flap.

FIG. 3 shows the radial outer edge 7 with the seal 8 made of PTFE and the spring 9 as a section of the flap 3. The spring 9 comprises an annular base body 11, from which the spring tongues 10 extend radially outwards. The base body 11 and the radially inner-lying part of the seal 8 are molded over with the flap material, so that both elements are fixedly joined to the flap 3.

Figure 4:
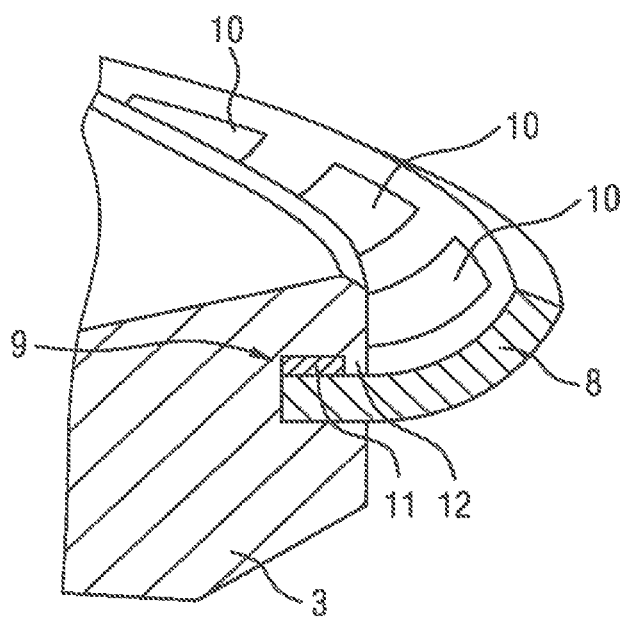

FIG. 4 shows a slightly different spring 9 compared to FIG. 3. The base body 11 comprises a smaller radial extent between each two spring tongues 10 at some points distributed over the periphery, so that during molding over the flap material extends to the seal 8. As a result of the undercut 12 produced in this way, the spring 9 is irreversibly joined to the flap 3.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve device for a fuel cell arrangement in a motor vehicle, the valve device comprising:
   a housing;
   a flow channel extending in the housing;
   a flap configured to influence a flow cross-section in the flow channel;
   a shaft to which the flap is attached, the shaft being rotatably supported in the housing;
   a drive configured to drive the flap via the shaft;
   a valve seat arranged in the flow channel;
   a seal comprising polytetrafluoroethylene (PTFE) arranged so as to extend on a radially peripheral edge of the flap, the seal being configured to contact the valve seat with the flap in a closed position of the flap, so that the shaft passes through the flap at an angle; and
   a metal spring arranged radially peripherally with respect to the flap and attached to, or formed within, the seal, the metal spring comprising:
      a plurality of spring tongues uniformly disposed at a periphery of the seal, and
      an annular base body from which the spring tongues extend radially outwards,
   wherein the annular base body of the metal spring and a radially inner-lying part of the seal are partly encapsulated by material of the flap.

2. The valve device as claimed in claim 1, wherein the spring comprises between 10 and 30 spring tongues.

3. The valve device as claimed in claim 1, wherein the seal and the metal spring are partly encapsulated by the material of the flap by injection molding.

4. The valve device as claimed in claim 1, wherein the metal spring comprises at least one section forming an undercut filled with material of the flap.

* * * * *